April 1, 1930.  A. C. MENNINGEN  1,752,349
VEHICLE HEADLIGHT
Filed Sept. 29, 1928
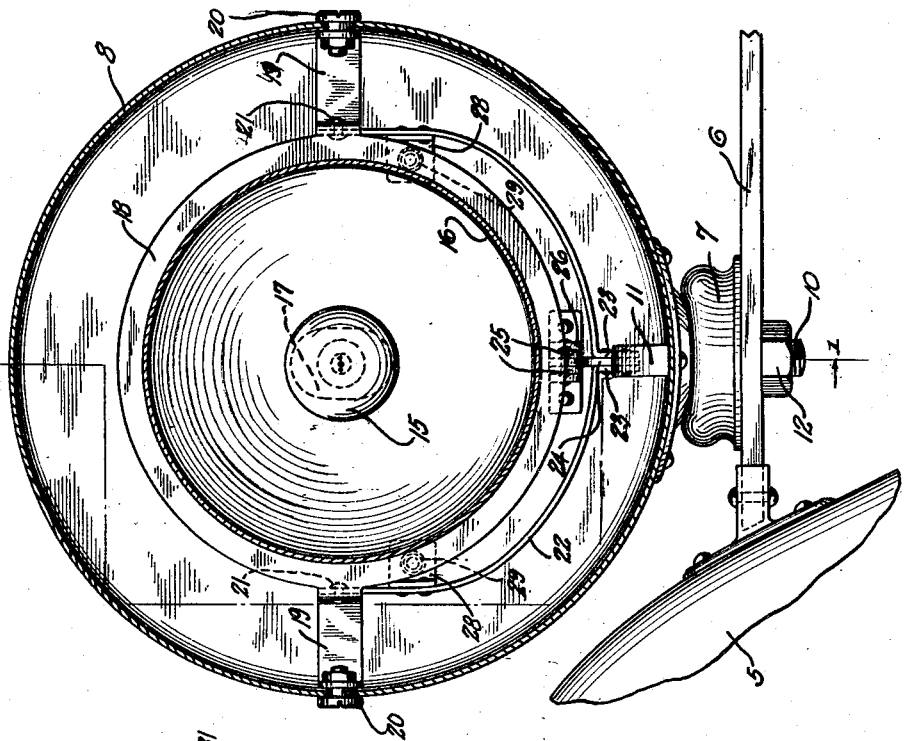
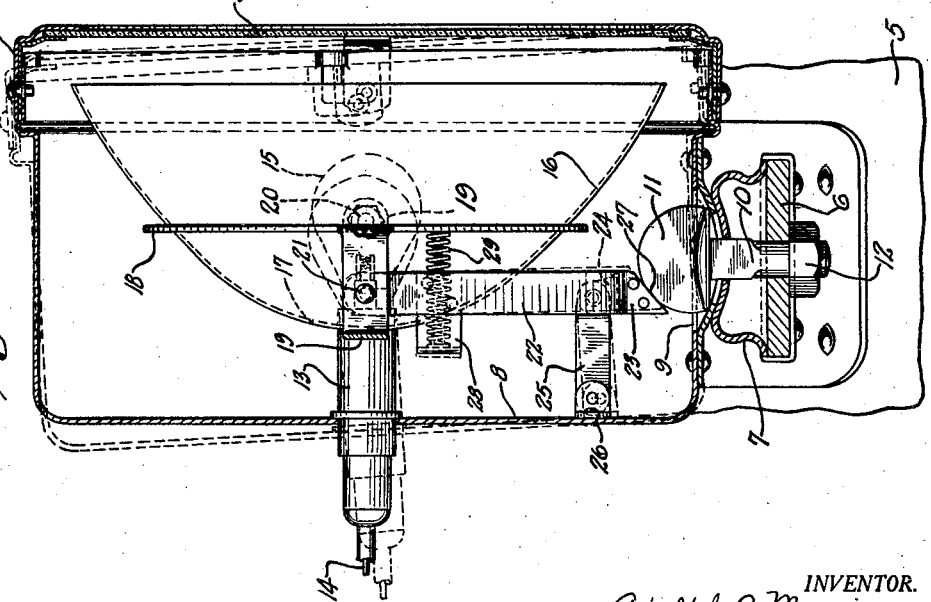
INVENTOR.
Adolph C. Menningen,
BY
Morsell, Keeney & Morsell
ATTORNEYS Patented Apr. 1, 1930

1,752,349

UNITED STATES PATENT OFFICE

ADOLPH C. MENNINGEN, OF WEST ALLIS, WISCONSIN

VEHICLE HEADLIGHT

Application filed September 29, 1928. Serial No. 309,158.

This invention relates to improvements in vehicle headlights, and more particularly to a vehicle headlight in which the plane of the headlight reflector is at all times automatically maintained in a position at right angles to the plane of the vehicle.

In motor vehicles, each headlight is adjustably clamped on a bracket, and in time, due to the jolting and vibrations of the vehicle, the headlight is apt to work or be jarred slightly out of adjustment so that the light rays will not be properly directed.

It is, therefore, the primary object of the present invention to provide a vehicle headlight arranged so that if it should get out of correct adjustment with respect to its mounting the headlight reflector will be automatically maintained and held with respect to the plane of the vehicle so as to throw the light beams in an exactly correct forward and slightly downward direction.

A further object of the invention is to provide a vehicle headlight in which, at any tilted position of the headlight casing, the headlight bulb is always equi-distant from all points on the reflector surface so that the intensity of the light beam is not varied.

A further object of the invention is to provide a vehicle headlight in which the reflector is pivotally mounted within the headlight casing and is held in adjusted positions therein against the tension of springs.

A further object of the invention is to provide a vehicle headlight in which the reflector is automatically adjusted, which is strong and durable, with which any vehicle may be readily equipped, and which is well adapted for the purposes described.

With the above and other objects in view the invention consists of the improved vehicle headlight, and its parts and combinations as set forth in the claims, and all equivalents thereof.

In the accompanying drawing in which the same reference characters indicate the same parts in both views;

Fig. 1 is a vertical sectional view taken on line 1—1 of Fig. 2, with a tilted, out-of-adjustment position of the headlight casing being shown in dotted lines; and Fig. 2 is a front view of a headlight with the casing and reflector shown in vertical section.

Referring now more particularly to the drawing it will appear that the numeral 5 indicates a vehicle fender carrying a laterally projecting arm 6 on which is mounted a bracket 7 supporting a headlight casing 8. The bottom portion of the casing is provided with a slot 9, and a bolt 10, having an enlarged curved cam head 11 extends through the arm 6, the bracket 7, and the casing slot 9, and has a securing nut 12 threaded on its lower end portion. The casing slot 9 permits the casing to be correctly adjusted on the bolt 10, in a vertical position with respect to the bracket.

A light socket 13 extends centrally through the rear of the casing 8 and a circuit wire 14 is connected with said socket. An incandescent bulb 15 is carried by the socket within the casing.

Pivotally mounted within the casing is a dished reflector member 16 having a vertically elongated central opening 17 through which said bulb 15 projects permitting pivotal movements of the reflector with respect to the bulb.

The means for pivotally mounting the reflector within the headlight casing include an annular ring member 18 carried by the reflector and said ring member is formed with a pair of diametrically opposed, side, rearwardly turned, U-shaped arm portions 19, each of which is pivotally secured to a side of the casing, as at 20. Said pivot points 20 are in the focal plane and pass through the focus of the reflector 16 so that a tilting of the reflector does not change the focal relation of the light source with respect to the reflector. There is also pivotally secured to the inner side portions of said arms 19, as at 21, the upper end portions of a depending U-shaped or yoke member 22, formed with a pair of spaced lower lug portions 23 between which the lower end portion of a short bracket 24 is secured. The upper end portion of said bracket 24 is pivotally secured to a doubled link 25 which is pivotally secured at its rear end portion to a bracket 26 projecting from an inner lower portion of the casing. The lower end portions of the lug portions 23 are downwardly rearwardly inclined, as at 27, to ride with respect to the bolt cam head 11, as will be more fully explained.

The upper end portions of the yoke member 22, below the arms 19, carry rearwardly projecting L-shaped members 28, and coiled springs 29 are yieldingly interposed between the rear flanges of the members 28 and the ring member 18. Hence, when there is a pivotal movement between the reflector and headlight casing in one direction said springs will be compressed, while a relative pivotal movement between the reflector and casing in the other direction will permit an expansion of said springs, and said springs will assist in said relative pivotal movement. Normally, however, said springs are slightly compressed, with the result that the reflector is cushioned and is held against undesired looseness, play and rattling.

The front portion of the headlight casing removably carries an open faced frame or cover 30 which removably holds in position a lens 31 of usual construction.

Normally, the headlight is supposed to be mounted on its supporting bracket in correct adjustment so that the plane of the headlight casing is perpendicular to the plane of the vehicle. The parts, therefore, should be in the full line positions shown in Fig. 1. It is often the case, however, that after use, the headlight will work slightly out of adjustment on its supporting bracket, and when the casing is tilted slightly rearwardly from vertical, as in dotted lines in Fig. 1, the inclined edge 27 of the member 23 will ride upwardly on the bolt cam head 11, causing an upward movement of the yoke 22, and effecting a relative pivotal movement between the reflector and casing, in a clockwise direction so far as the reflector in Fig. 1 is concerned, but the result will be that the reflector is automatically maintained in a correct unchanged position at right angles to the plane of the vehicle for the proper directioning of the light rays. During this movement the springs 29 will be compressed. In any forwardly tilted movements of the casing the member 22 will be lowered and the expansive force of the springs 29 will cause a relative pivotal movement between the casing and reflector, whereby the reflector is maintained perpendicularly to the plane of the vehicle.

From the foregoing description it will be seen that the improved headlight is constructed to automatically maintain the reflector perpendicularly to the plane of the vehicle, for the proper directioning of light rays, regardless of the fact that the casing may work out of correct adjustment on its mounting. Also, the headlight is both simple and novel and is well adapted for the purposes described.

What I claim is:

1. A vehicle headlight, comprising a casing, a reflector movably mounted within the casing, a lamp bulb adjacent the reflector, means for adjustably connecting the casing to a vehicle, and a cam carried by said connecting means and adapted to coact with said reflector to maintain the same in a predetermined position of alinement with relation to the road travelled by the vehicle regardless of the position of the headlight casing.

2. A vehicle headlight comprising a casing, a reflector movably mounted within the casing, a lamp bulb adjacent the reflector, means for adjustably connecting the casing to vehicle, a cam carried by said connecting means, and yielding means engaging the reflector, said cam and said yielding means being adapted to coact with the reflector to maintain the same in a predetermined position of alinement with relation to the road travelled by the vehicle regardless of the position of the headlight casing.

3. A vehicle headlight comprising a casing, a reflector pivotally mounted within the casing and having an extension, a lamp bulb adjacent the reflector, means for adjustably connecting the casing to vehicle, and a cam carried by said connecting means and adapted to coact with the reflector extension to maintain said reflector in a predetermined position of alinement with relation to the road travelled by the vehicle regardless of the position of the headlight casing.

4. A vehicle headlight comprising a casing, a reflector pivotally mounted within the casing for forward and rearward pivotal movements with respect thereto and having an extension with an inclined lower end portion, a lamp bulb adjacent the reflector, means for adjustably connecting the casing to a vehicle, and a cam carried by said connecting means and adapted to engage the inclined lower end portion of the reflector extension to maintain the reflector in a predetermined position of alinement with relation to the road travelled by the vehicle regardless of the position of the headlight casing.

5. A vehicle headlight comprising a casing, a reflector pivotally mounted within the casing, a lamp bulb adjacent the reflector, means for adjustably connecting the casing to a vehicle, an arm having one end pivoted to the reflector, yielding means between said arm and the reflector, a link having one end pivoted to the casing and its other end pivoted to said arm, and a cam carried by the adjustable connecting means and adapted to coact with the reflector arm to maintain said reflector in a predetermined position of alinement with relation to the road travelled by the vehicle regardless of the position of the headlight casing.

6. A vehicle headlight comprising a casing, a reflector pivotally mounted within the casing and having a central slot, a lamp bulb in connection with the casing and extending through the slot in the reflector, a depending U-shaped member having its ends pivotally connected to opposite sides of the reflector, the lower portion of said U-shaped member having an extension with an inclined lower end portion, yielding means between said U-shaped member and the reflector, a link having one end pivoted to the casing and its other end pivoted to the U-shaped member, means for adjustably connecting the casing to a vehicle, and a cam carried by said connecting means and adapted to engage the inclined lower end portion of the extension of the U-shaped member to maintain said reflector in a predetermined position of alinement with relation to the road travelled by the vehicle regardless of the position of the headlight casing.

7. A vehicle headlight comprising a casing having a slot in its lower portion, a reflector pivotally mounted within the casing, a lamp bulb adjacent the reflector, a bolt extending through the slot in the lower portion of the casing for adjustably securing the casing to a vehicle, and a cam carried by the head of said bolt and adapted to coact with the reflector to maintain the same in a predetermined position of alinement with relation to the road travelled by the vehicle, regardless of the position of the headlight casing.

In testimony whereof, I affix my signature.

ADOLPH C. MENNINGEN.